A. J. DANIEL.
DIPPER FOR ICE CREAM CONES.
APPLICATION FILED OCT. 1, 1909.

953,901.

Patented Apr. 5, 1910.

Witnesses.
W. A. Loftus
A. G. Hague

Inventor.
A. J. Daniel.
by Orwig & Saul, Atty's.

UNITED STATES PATENT OFFICE.

ALBERT JOHN DANIEL, OF BOONE, IOWA.

DIPPER FOR ICE-CREAM CONES.

953,901.  Specification of Letters Patent.  Patented Apr. 5, 1910.

Application filed October 1, 1909. Serial No. 520,497.

*To all whom it may concern:*

Be it known that I, ALBERT JOHN DANIEL, a citizen of the United States, residing at Boone, in the county of Boone and State of Iowa, have invented a certain new and useful Dipper for Ice-Cream Cones, of which the following is a specification.

The object of my invention is to provide a dipper of simple, durable, and inexpensive construction, so arranged that by its use the operator may quickly and easily fill a dipper with a quantity of ice cream or similar material which will be of cone shape, and also to provide a dipper by which said cone-shaped material may be readily and easily deposited in an ice cream cone without the necessity of having the ice cream or other material touched by the hand of the operator.

My invention consists in the construction, arrangement, and combination of the various parts of the device whereby the objects contemplated are attained, as hereinafter more fully set forth, pointed out in my claims, and illustrated in the accompanying drawings, in which—

Figure 1:
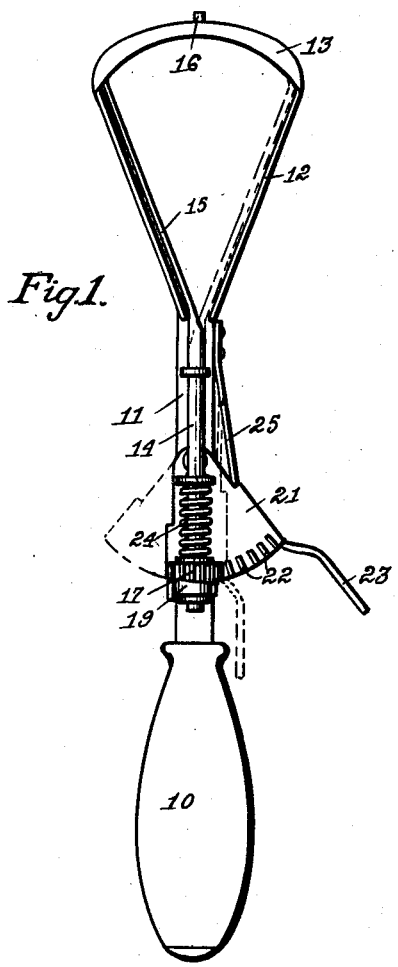
Figure 2:
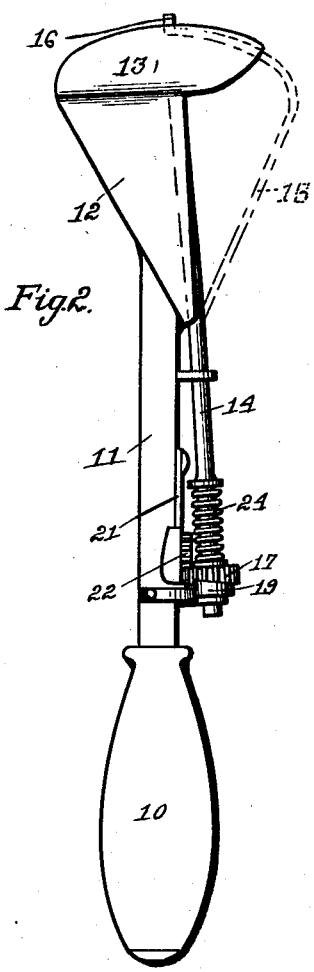
Figure 3:
Figure 4:
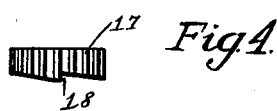

Figure 1 shows a front elevation of a complete device embodying my invention. Fig. 2 shows a side view of same. Fig. 3 shows an enlarged, detail side view illustrating the ratchet disk on the main operating shaft, and Fig. 4 shows a detail, side view of the ratchet pinion to co-act with said ratchet disk.

Referring to the accompanying drawings, I have used the reference numeral 10 to indicate the handle, and 11 the rigid shank connected to the handle. On the outer end of the shank is a dipper body portion 12 which is of substantially cone shape, with its apex adjacent to one side of the shank 11 and its base rounded at 13. Approximately one-half of the cone-shaped dipper is cut away on the side adjacent to the side of the shank where the apex of the cone is located, and a portion of the rounded base 13 is also cut away at the same side, as clearly indicated in Figs. 1 and 2, the arrangement being such that the operator may, by grasping the handle 10, insert the dipper in a quantity of ice cream or other material and may then readily and easily fill the dipper through the open side and end thereof.

To provide means for cutting out the ice cream or other material in an inverted cone shape, and also for releasing it from the dipper, I have provided the following mechanism: Mounted on the shank 11 is a shaft 14 extended through the apex of the cone and provided with a blade 15, which blade lies parallel with the cone and is curved at its outer end to fit the contour of the curved base of the cone. The end of said blade is extended through the center of the base at 16. By this arrangement, it is obvious that when the shaft 14 is rotated from the position shown in Fig. 1, one-half of a revolution across the open portion of the cone, then the ice cream or other material through which the blade passes will be severed from the other material remaining in the receptacle and the part of the ice cream or other material remaining in the cone will be given a cone shape. The material in the cone will adhere to the parts 12 and 13 and then the operator may hold the device in an upright position with the handle down, and he may then place the apex of the part 12 adjacent to a cone of the kind ordinarily used for containing ice cream and then when the blade 15 is turned through a half revolution adjacent to the interior of the parts 12 and 13, the ice cream will be removed from the parts 12 and 13 and will then drop into the ice cream cone and approximately fit therein as required to fill the cone.

I have provided the following mechanism for actuating the blade 15. This mechanism comprises a small pinion 17 rotatably mounted on the lower end of the shaft 14 and provided on its under surface with ratchet teeth 18. Beneath the pinion 17 is a disk 19 firmly fixed to the shaft 14 and provided with ratchet teeth 20 on its upper surface to co-act with the ratchet teeth 18. For operating the pinion 17, I have provided a segmental plate 21 pivoted to the shank 11 and having cog teeth 22 thereon to mesh with the pinion 17, and on this plate 21 is a handle 23 so arranged that it may be easily and conveniently engaged by an operator's thumb when his hand is grasping the handle 10. The parts are so arranged and proportioned that a complete movement of the handle 23 toward the handle 10 will cause the knife blade 15 to turn just one-half of a revolution, and the ratchet teeth 20 and 18 are so arranged that they will cause the knife blade to stop at two points throughout its movement, one being adjacent to one edge of the cone 12 and the other adjacent to the opposite edge of the cone 12 so that one movement of the knife blade will be effective in cutting out the material between the dipper and the mass of material in the receptacle in which it is held, and the other movement will be effective in loosening the material from the parts 12 and 13. I have also provided a spring 24 on the shaft 14 for yieldingly holding the pinion 17 in engagement with the disk 19, and I have also provided a spring 25 fixed to the shank 11 for normally returning the plate 21 to position with the handle 23 spaced apart from the handle 10.

In practical operation and assuming that the knife blade 15 is in the position shown in Fig. 1, then the operator places the dipper in the receptacle containing ice cream and causes the parts 12 and 13 to be filled with said material. He then manipulates the handle 23 which causes the ice cream contained within the dipper to be separated from the ice cream contained within the receptacle. He then removes the dipper from the receptacle and places it adjacent to an ice cream cone; and then by another movement of the handle 23, the ice cream is detached from the dipper and permitted to drop into an ice cream cone.

I claim as my invention:

1. A device of the class described, comprising a handle, a shank fixed to the handle, a dipper fixed to the shank, said dipper comprising a body portion of substantially cone-shape with its apex adjacent to one side of the shank, the outer end of the dipper being rounded and partially open at the side toward the open part of the cone, a shaft rotatably supported on the shank extended through the apex of the cone and having a blade shaped to fit the interior of the cone and of the base portion, and having a bearing in the central portion of said base, and means for rotating said shaft, said means comprising a ratchet disk fixed to the shaft, a pinion rotatably mounted on the shaft and having a ratchet face to engage the ratchet disk, and a segmental rack in mesh with said pinion, said rack being provided with a handle whereby it may be operated.

2. A device of the class described, comprising a handle, a shank fixed to the handle, a dipper fixed to the shank, said dipper comprising a body portion of substantially cone shape with its apex adjacent to one side of the shank, the outer end of the dipper being rounded and partially open at the side toward the open part of the cone, a shaft rotatably supported on the shank extended through the apex of the cone and having a blade shaped to fit the interior of the cone and of the base portion, and having a bearing in the central portion of said base, and means for rotating said shaft, said means comprising a ratchet disk fixed to the shaft, a pinion rotatably mounted on the shaft and having a ratchet face to engage the ratchet disk, and a segmental rack in mesh with said pinion, said rack being provided with a handle whereby it may be operated, and a spring for moving the segmental rack in one direction.

3. A device of the class described, comprising a handle, a shank fixed to the handle, a dipper fixed to the shank, said dipper comprising a body portion of substantially cone-shape with its apex adjacent to one side of the shank, the outer end of the dipper being rounded and partially open at the side toward the open part of the cone, a shaft rotatably supported on the shank extended through the apex of the cone and having a blade shaped to fit the interior of the cone and of the base portion, and having a bearing in the central portion of said base, and means for rotating said shaft, said means comprising a ratchet disk fixed to the shaft, a pinion rotatably mounted on the shaft and having a ratchet face to engage the ratchet disk, and a segmental rack in mesh with said pinion, said rack being provided with a handle whereby it may be operated, said rack and said ratchet devices being so arranged and proportioned that a complete movement of the rack will operate to move the blade one-half revolution from one edge of the cone-shaped portion of the dipper to the opposite edge thereof.

Des Moines, Iowa, Sept. 4, 1909.

ALBERT JOHN DANIEL.

Witnesses:
  JAMES R. GRANT,
  W. H. BURWELL.